Patented Nov. 27, 1951

UNITED STATES PATENT OFFICE 2,576,113

PROCESSES FOR THE PRODUCTION OF OXYGENATED COMPOUNDS

Hugh J. Hagemeyer, Jr., Kingsport, Tenn., assignor to Eastman Kodak Company, Rochester, N. Y., a corporation of New Jersey No Drawing. Application April 22, 1948, Serial No. 22,713

8 Claims. (Cl. 260—604)

This invention relates to the production of oxygenated organic compounds such as aldehydes, ketones, alcohols, and the like. More particularly this invention is concerned with the production of carbonyl compounds such as propionaldehyde and butyraldehyde by a novel catalytic process involving the reaction of an olefin with a source of carbon monoxide and hydrogen.

There are a number of publications and patents outstanding which describe the reaction of various types of olefins, both aliphatic and cyclic with carbon monoxide and hydrogen and other components in the presence of various catalysts but not catalysts comparable to the catalysts of the present invention. In many of the processes of the prior art the reaction proceeded to acid formation rather than the producion of carbonyl compounds such as aldehydes and ketones. It is, however, apparent from the prior art that various olefinic compounds, or similar type compounds containing a double bond, may be caused to react with carbon monoxide and hydrogen. The most interesting prior art of which I am aware is certain foreign description concerning a German process for reacting olefins with water gas. This reaction was carried out in the presence of a solid catalyst comprised of cobalt, thoria, magnesia, and kieselguhr in toluene as a diluent. That is, it appears that the so-called Fischer-Tropsch type of catalyst was used. It is further interesting to note that the prior art catalysts for the production of aldehydes are solids which depend on specially activated points for their activity. In this respect they function much the same as hydrogenation catalysts, e. g., Raney nickel, in which the hydrogen is transformed from the active points on the catalyst to the compound to be hydrogenated. With solid catalysts there is a tendency to local superheating at the active point which shortens the life of the catalyst and also in the case of the present process lowers the yield of aldehyde due to secondary condensation reactions.

The catalysts of the prior art require special methods of preparation and activation to form suitable catalyst materials. The ratio of catalyst to support and the method of impregnation are also critical. These catalysts are useful for only relatively short periods of time before they must be recovered and regenerated. Such steps entail considerable cost, inconvenience and loss of catalyst materials due to separation difficulties as well as mechanical losses. There is also the added problem of recovery of the carbonyl forming metal which is extracted as metal carbonyl from the catalyst bed or slurry by solution in the reaction product. Other disadvantages of the prior art catalysts include their susceptibility to poisons such as oxygen, sulfur and hydrogen sulfide and the negative effect of water vapor. Another important practical disadvantage of the prior art catalysts is their initial cost.

I have found that many of the difficulties of the prior art may be overcome and an improved process obtained by employing certain metal salts as the catalyst, provided my soluble metal salt type of catalyst is suitably buffered, as will be described in detail hereinafter. In addition, my catalyst may contain promoters and other usual catalyst additions. I have found that by means of this novel type of catalyst, reactions may be caused to go to the production of good yields of carobnyl compounds, as will be described in detail hereinafter.

This invention has for an object to provide an improved method for the manufacture of oxygenated organic compounds. A further object is to provide an improved process for the manufacture of carbonyl compounds such as lower aliphatic aldehydes and ketones from feed material comprising an organic compound which contains a double bond reacted with a source of carbon monoxide and hydrogen. Another object is to provide a method for the carrying out of reactions of the class described in the presence of a new type of buffered catalyst. Still another object is to provide a new catayst and method of preparation as well as the use thereof. A still further object of the present invention is to provide a catalyst solution in which the reaction temperature is evenly distributed. Another object of the present invention is to provide a catalyst solution in which a minimum loss in aldehyde is experienced because of aldehyde condensations. Other objects will appear hereinafter.

As discussed above, many of the prior art types of catalysts comprised base metals, with or without various promoters, and the processes utilizing the catalysts resulted in acid formation. While it is not desired to be bound by any particular theory of operation respecting catalytic process of the class described, it has been shown that the pH of the reaction environment has considerable bearing on the reaction results.

A general understanding of the mechanism of reactions of the class described, as well as a further understanding of the instant invention, will be had from the following general considerations.

In the present invention I have found that the difficulties of the prior art can be overcome by the use of buffered metal salts. The preferred catalyst is composed of a metal salt of cobalt, or iron together with a suitable buffering agent and may be employed in the presence or absence of promoters. In general, soluble salts of cobalt, and iron are preferred, although insoluble salts and even the oxides may be used as the starting catalyst material. Carbonyl derivatives soluble in the reaction products and residues therefrom are formed in any case and are recycled in a continuous batchwise operation. In batchwise operation the metal carbonyl and/or metal carbonyl hydride solution can be formed in situ by reacting the solution or suspension of the metal salt with carbon monoxide prior to carrying out the reaction of an olefin with carbon monoxide and hydrogen.

Water is used simply as a vehicle for adding a suitable soluble salt to the reactor. The active component, the metal carbonyl and/or metal carbonyl hydride, is extracted by the organic layer as rapidly as it is formed. If the carbonyls of cobalt or iron are used as the catalyst, water can be omitted and the preferred solvents for the reaction are the lower aliphatic alcohols. Where separation difficulties are not involved a homogeneous, rather than a heterogeneous, system is obtained by using methanol, ethanol, isopropanol, or butanol. The amount of water present is limited to that required to obtain a solution of the metal salts. The buffering agent becomes a stabilizing agent for the active form of the metal carbonyl when the starting catalyst material is a carbonyl compound of cobalt or iron.

A fixed bed type catalyst may be used wherein the cobalt or other catalyst content of the bed is continually replenished by cycling a solution containing a suitable buffering agent and a soluble catalyst salt or carbonyl compound.

I have found that the reaction products obtained with the catalysts of the present invention depend upon the pH of the catalyst solution. Cobalt carbonyl hydride is readily formed from soluble cobalt salts in the presence of carbon monoxide and water at 120–200° C. and 40–400 atmospheres.

$$2CoX_2 + 11CO + 3H_2O \rightarrow 2CoH(CO)_4 + 3CO + 4HX$$

where X is halogen, sulfate/2, cyanide, acetate, propionate, butyrate, organic thioacid, hexamine halide, etc. In the absence of suitable buffering agents and at pH<5, elevated temperatures and pressures are required and a different reaction course is obtained, e. g., with ethylene, propionic acid is the chief product.

(280–340° C. @ 4–6000 p. s. i.)

$$CH_2=CH_2 + CO + H_2 + (H_2O) \longrightarrow CH_3CH_2COOH + CH_3CH_2CH_2OH$$

$$2CoH(CO)_4 \xrightarrow[pH<5]{} 2Co(CO)_4 + H_2$$

By the addition of a suitable buffering agent to buffer the acid formed in the formation of the metal carbonyl and/or metal carbonyl hydride an equilibrium condition is established for the catalyst and the reaction takes place rapidly at lower temperatures and pressure to form propionaldehyde and diethyl ketone in an 80:20 mol percent ratio with an overall yield of 90–95%.

(90–140° C. @ 600–3000 p. s. i.)

$$CH_2=CH_2 + H_2 + CO + (H_2O) \longrightarrow CH_3CH_2CHO + (C_2H_5)_2CO$$

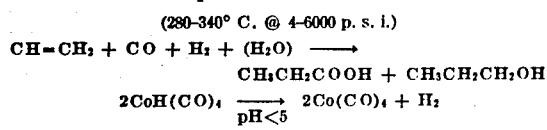

$$2Co(OCOCH_3)_2 + 9CO + H_2O \xrightarrow[pH=5-8]{} 2CoH(CO)_4 + 4CH_3COOH + CO_2$$

The preferred pH range is 6.3–6.9 and in this range the equilibrium condition.

$$2CoH(CO)_4 \underset{pH=6.3-6.9}{\rightleftarrows} 2Co(CO)_4 + H_2$$

probably exists.

At a pH=7 and above alcohols are formed in increasing amount, with a proportional increase in the formation of carbon dioxide. Iron salts and iron pentacarbonyl function similarly, although, in general, less buffer or stabilization agent is required with the iron catalysts.

The preferred catalysts of the present invention are the lower aliphatic acid salts of cobalt and iron in water or water-alcohol solution and buffered with sodium and/or potassium salts of the aliphatic carboxylic acids and/or tertiary nitrogenous bases. Cobalt basic carbonate is also a preferred catalyst material. These catalysts may or may not be used with small amounts of promoter materials such as the aliphatic acid salts of thorium and magnesium.

I have also found that the presence of the lower aliphatic alcohols has a desirable effect on the rate of reaction. The use of alcohols, and/or the still residues from the products of the reaction, together with a buffered solution of a soluble metal salt, greatly increases the rate of reaction. Alcohols form a complex with metal carbonyls which decomposes with the formation of the corresponding metal carbonyl hydrides.

$$2Co(CO)_2R + 2H + \rightarrow$$

$$CoH(CO)_4 + Co^{++} + \tfrac{1}{2}H_2 + R$$

where R is methanol, ethanol, isopropanol, n-butyl alcohol, etc. This decomposition tendency of the alcohol-metal carbonyl complex can be considered as a catalyst promoter.

The reaction of olefins with carbon monoxide and hydrogen can be represented by the fundamental equations:

$$RCH=CHR + CO + H_2 \rightarrow RCH_2CHRCHO$$

$$2RCH=CHR + CO + H_2 \rightarrow$$

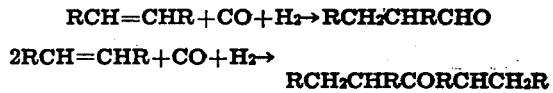

$$RCH_2CHRCORCHCH_2R$$

wherein R is hydrogen, alkyl, aryl, or other organic residue.

Therefore, recapitulating, the catalysts of the present invention include a variety of salts of cobalt, and iron, although, in general, water soluble salts are preferred where a continuous operation is to be performed. The preferred catalyst materials are the cobalt, and iron salts of the lower aliphatic carboxylic acids and cobalt basic carbonate. Compounds such as the halides and the cobalt and iron ammonium halide complexes are equally active but require special reactor linings because of corrosion problems.

Promoters such as chromium, cerium, manganese, aluminum, thorium, and magnesium are usually employed in the form of salts of the aliphatic carboxylic acids.

Suitable buffering agents include the alkali salts of the aliphatic carboxylic acids, amino acids, alkalis, alkali alkoxides, tertiary nitrogeneous compounds, and other buffering agents or combinations thereof which will maintain neutral conditions may be used. Sodium acetate, sodium butylate, barium hydroxide, pyridine, triethanol amine, diethyl amino ethanol, sodium butyrate and triethyl amine have been used in buffering the catalyst solution.

A typical catalyst composition contains 20 parts of cobaltous acetate, six parts of sodium acettae, two parts of magnesium acetate and 0.75 part of thorium acetate dissolved in water. The reaction can be carried out in any suitably agitated vessel or in a continuous fashion by passing the gas mixture countercurrent to a circulating liquid stream. The reactor may or may not be packed with inert materials such as Raschig rings, Berl saddles, pumice, etc. Catalyst concentrations between 3–10%, are preferred.

Higher or lower concentrations may be used, although there is no advantage in doing so.

Where cobalt and iron salts are used as the carbonyl forming materials in a continuous or intermittent batchwise operation it is sufficient to recycle the residual material from the base heaters of the product stills.

In some instances it may be preferred to use a fixed bed catalyst with a typical Fischer-Tropsch composition 36%Co, 2% ThO, 2% MgO, 60% kieselguhr. A buffered solution of a soluble carbonyl-forming metal salt is then cycled through the reactor and replenishes any cobalt lost by extraction of the metal as metal carbonyl in the product. A portion of the cycling material is removed continuously to a flash heater where the product is removed and the residual material is returned to the high pressure system.

The preferred reaction temperature varies with the particular catalyst and, in general, a temperature slightly above the threshold temperature is preferred for the preparation of aldehydes and ketones. At higher temperatures the alcohols are formed in increasing amounts. With cobalt catalysts, the threshold temperature is approximately 90–100° C. and the optimum reaction temperature for carbonyl compounds is 140± 5° C. With iron, temperatures of 140–180° C. are required. Temperatures up to 250° C. may be employed in the production of alcohols. Other factors affecting the formation of alcohols include: the excess of hydrogen present; the time of reaction; and the nature of the specific unsaturated compound treated. Pressures between 40–700 atmospheres are desirable.

Typical catalyst compositions and applications are described in the following examples:

EXAMPLE 1

Twenty grams of cobaltous acetate, eight grams of sodium acetate, two grams of magnesium acetate and 0.5 gram of thorium acetate were dissolved in 200 cc. of distilled water. The catalyst solution was placed in an autoclave together with 200 cc. of normal propyl alcohol.

In a period of 60 minutes five gram mols of ethylene, carbon monoxide, and hydrogen were charged to the reactor. The products were blown out of the autoclave immediately and distilled. Propionaldehyde and diethyl ketone were formed in 73 percent and 16 percent yields, respectively, with approximately 3 percent methylethyl acrolein; analysis of the off gas showed only 1.0 percent ethane and 0.2 percent methane.

EXAMPLE 2

Ten grams of iron basic acetate, twenty grams of water and 200 grams of normal butyl alcohol were charged to a stainless steel autoclave. 205 grams of propylene were charged to the reactor and the mixture was heated to 150° C. while adding carbon monoxide and hydrogen in a 1:1 mol ratio to raise the pressure to 3500 p. s. i. After a 30 minute induction period a rapid reaction took place and carbon monoxide and hydrogen were added in a 1:1 mol ratio at 2500–3500 p. s. i. until the reaction stopped. The product was blown off and distillation gave a 62% yield of a mixture or normal and isobutyraldehyde azeotropes.

The still residue was treated with 1 gram of triethanolamine and returned to the autoclave. The autoclave was charged with 200 grams of propylene and again carbon monoxide and hydrogen were added in 1:1 ratio. No induction period was required and the reaction was carried to completion at 120–150° C. and 1200–3000 p. s. i. An 88% yield of a mixture of normal and isobutyraldehyde was obtained.

EXAMPLE 3

This example is representative of an intermittent batchwise operation. The catalyst used in runs 77 through 82 comprised 20 grams of cobalt acetate, 6 grams of sodium acetate, 2 grams of magnesium acetate, 0.75 gram of thorium acetate dissolved in 200 cc. of distilled water. After 6 intermittent batchwise runs of 5 mols each this catalyst was stored for ten days and then reused. No loss in activity was observed.

*Conditions*

| Run No. | Gas Ratio, CO/H₂ | Ave. Temp. | Pressure | | Gram Mols | Time/ Gr. Mols | Overall Conv. |
|---|---|---|---|---|---|---|---|
| | | | Low | High | | | |
| | | ° C. | | | | | Per cent |
| 77 | 1  1 | 140 | 2,700 | 5,000 | 5 | 46 m. | 74 |
| 78 | 1  1 | 140 | 3,100 | 5,500 | 6 | 40 m. | 68 |
| 80 | 1  1 | 140 | 2,000 | 5,500 | 6 | 36 m. | 87 |
| 81 | 1  1 | 140 | 1,200 | 5,000 | 4 | 38 m. | 76 |
| 82 | 1  1 | 140 | 1,200 | 5,550 | 5 | 39 m. | 96 |

| Run No. | Product Yield | | | | Off Gas | | | |
|---|---|---|---|---|---|---|---|---|
| | N-HBu | Iso-HBu | Ketones | High Boilers | CH₄C₂H₆ | C₃H₆ | CO | H₂ |
| 77 | 40.5 | 37 | 18.5 | 4 | 1.0 | 5.1 | 3.4 | 83.4 |
| 78 | 47.5 | 32 | 12.5 | 8 | 4.9 | 13.1 | 16.1 | 64.0 |
| 80 | 39 | 37 | 8.0 | 16 | 3.6 | 60.0 | 2.4 | 20.5 |
| 81 | 33 | 30 | 12.0 | 25 | 2.0 | 12.0 | 2.2 | 56.0 |
| 82 | 61 | 24 | 11.0 | 4 | 2.1 | 17.0 | 37.3 | 40.1 |

EXAMPLE 4

Cobalt iodide was substituted for cobalt acetate and the reaction carried out as in Example 1, using propylene in place of ethylene. An 84 percent yield of 54/46 mixture of normal and isobutyraldehydes was obtained.

EXAMPLE 5

One hundred grams of reduced ⅛" pellets containing 36% cobalt, 2% thoria, and 2% magnesia on kieselguhr were charged to an autoclave together with 200 cc. of a water solution containing 20 grams of cobaltous acetate tetrahydrate and 10 grams of sodium acetate. The pH was 7.0. 171 grams of propylene was charged to the autoclave and three gram mols each of carbon monoxide and hydrogen were added at 140° C. and 3000–3500 p. s. i. An 88 percent yield of a 34/66 mixture of iso and n-butyraldehyde was obtained.

EXAMPLE 6

Twenty grams of cobaltous acetate tetrahydrate, 0.75 gram of thorium acetate, 2.5 grams of magnesium acetate, and 6 grams of sodium acetate in 200 cc. of water, pH=6.1, were charged to an autoclave. Ethylene, carbon monoxide, and hydrogen were added in equimolar amounts at 200° C. and 3800–5000 p. s. i. Distillation of the reaction product gave 5.5 grams of propionaldehyde and 93.5 grams of propyl alcohol-water azeotrope.

EXAMPLE 7

Sixty grams of cobaltous acetate tetrahydrate, 2.5 grams of thorium acetate, and 7.5 grams of triethanol amine were dissolved in 200 cc. of distilled water to give a catalyst solution with a pH=6.3. This was charged to a 1200 cc. stainless steel autoclave together with 200 cc. of butanol and 4.4 gram mols of propylene. A 1/1 mixture of carbon monoxide and hydrogen was added at 145° C. and 1200–330 p. s. i. The rate of reaction was 13.2 gram mols per hour an an 80° yield of a 60/40 mixture of normal and isobutyraldehydes was obtained.

A rerun on the catalyst residue, pH=4.8, gave a reaction rate of only 1.7 gram mols per hour. By buffering to a pH=6.7 with triethanolamine this same catalyst solution on a rerun gave a reaction rate of 11.7 gram mols per hour.

EXAMPLE 8

Distilled high boilers from previous runs were substituted for the butanol in Example 7. An 84% yield of a mixture of normal and isobutyraldehydes was obtained with a reaction rate of 11.5 mols per hour. Pressures up to 5000 p. s. i. were also employed.

EXAMPLE 9

Twenty grams of cobaltous acetate and three grams of sodium acetate were slurried with three hundred grams of butanol, 30 cc. of water, and one mol (112 grams) of 2-ethyl hexene-1. The mixture was charged to a one liter autoclave and treated with equal parts of carbon monoxide and hydrogen at 3,000–3,500 p. s. i. and 140±5° C. A 72 percent yield of a 50:50 mixture of 3-ethyl heptaldehyde and 2-butyl, 2-methyl butyraldehyde was obtained.

EXAMPLE 10

One mol (82 gms.) of cyclohexene were treated as in Example 9. An 84 percent yield of cyclohexyl aldehyde was obtained.

EXAMPLE 11

Twenty grams of cobaltous propionate and 6 grams of sodium propionate were dissolved in 300 cc. of water-saturated butanol and the solution was charged to a one liter autoclave. The autoclave was charged with 205 grams of propylene and treated with equal parts of carbon monoxide and hydrogen at 130–140° C. and 3,000–4,500 p. s. i. A reaction rate of 12.1 gram mols per hour was obtained.

The product was removed from the autoclave and 200 cc. of water were added and the mixture distilled. 274 grams of a 60:40 mixture of the azeotropes of normal and isobutyraldehydes was recovered. The product in the base heater containing cobalt carbonyl in solution in butanol, together with the ketones and high boilers from the reaction, was separated from the water layer and charged to the autoclave. 211 grams of propylene and 6 gram mols each of carbon monoxide and hydrogen were charged to the autoclave at 2,000–3,000 p. s. i. and at 140±5° C. A 76% yield of normal and isobutyraldehyde azeotropes was obtained.

The distillation residue described above was recycled 14 times with an average reaction rate of 8.7 gram mols per hour.

It will be observed from the above examples that the aldehyde ketone product formed in the presence of catalyst may be continuously or intermittently withdrawn to a fractionation device, such as a small still. The carbonyl compounds, such as an aldehyde and/or a ketone, may be distilled off for commercial use leaving the catalyst materials as a residue of the separation. These catalyst materials may then be recycled to the process, with or without the addition of further metal salts and buffering agents.

The above examples have been set forth primarily for purposes of illustration and not as a limitation on the present invention. As discussed above in connection with the prior art, it is already known that various different types of olefins may be caused to react with carbon monoxide and hydrogen. While in the present examples I have described my invention in particular as applied to the lower aliphatic olefins, as this constitutes my primary interest, it should not be overlooked that the principles of my invention may be utilized with other olefinic materials and that valuable results may be obtained by employing my novel buffered catalyst in such other types of process.

Gaseous, liquid, or solid olefin hydrocarbons such as ethylene, propylene, butylene, butadiene and higher homologs may be employed. With olefins above ethylene a mixture of isomeric aldehydes are produced and, for example, with propylene approximately a 60:40 mixture of normal and isobutyraldehyde is produced. Reaction products have been obtained in which the aldehyde fraction constituted as much as ninety percent of the product by weight, although the aldehyde fraction generally averages about seventy percent, with the residue consisting of alcohols and ketones.

Other unsaturated compounds which may be employed include cyclo-olefins or unsaturated naphthenes, mixed aliphatic hydrocarbons, i. e., aliphatic hydrocarbons which contain aromatic radicals, such as styrene; or hydrocarbons of the terpene series, such as limonene or pinene, or products of substitution of these unsaturated hydrocarbons, for instance, unsaturated alcohols, aldehydes, acids or halogen derivatives which, by condensation with carbon monoxide and hydrogen, are converted, respectively, into keto alcohols, or oxy aldehydes, diketones, ketoaldehydes, dialdehydes, diketones, ketonic acids, or haloaldehydes. Vinyl esters can be employed to form acyloxy aldehydes and saturated aldehydes.

Ethylene, propylene, butylene, styrene, allyl alcohol, crotonaldehyde, butadiene, mesityl oxide, vinyl acetate, isopropenyl acetate, cinnamic aldehyde, and stilbene are representative of the compounds which may be employed as the olefin in this process. With vinyl acetate the reaction can be represented by the equation:

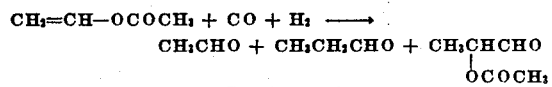

EXAMPLE 12

Ten grams of cobaltous acetate tetrahydrate and two grams of sodium acetate were dissolved in 50 cc. of water and diluted with 450 cc. of butanol. The catalyst solution was charged to a one liter stainless steel autoclave together with 172 grams of vinyl acetate. Carbon monoxide and hydrogen were added in equimolar amounts and the autoclave was heated to 135–145° C. at 2900–4000 p. s. i. The reaction took place at the rate of 7.3 gram mols per hour. The contents of the autoclave were discharged while hot and distilled. Twenty-four grams of acetaldehyde, 64 grams of propionaldehyde, and 12 grams of acetoxy propionaldehyde were isolated.

EXAMPLE 13

Two hundred grams of isopropenyl acetate were reacted as in Example 12. Sixteen grams of acetaldehyde, 87 grams of a mixture of normal and isobutyraldehyde and 27 grams of a mixture of alpha acetoxy butyraldehyde and alpha acetoxy isobutyraldehyde were obtained.

It is believed from the above that it may be seen an improved method has been shown for the reaction of a number of organic compounds with carbon monoxide and hydrogen in the presence of a better catalyst whereby the reaction is materially improved in many respects.

What I claim as my invention and desire to be protected by Letters Patent of the United States is:

1. The continuous process for producing lower aliphatic aldehydes which comprises reacting a lower aliphatic olefin with a source of carbon monoxide and hydrogen, said reaction being carried out at elevated temperatures and pressures within the range of 50° C. to 250° C. and 40 to 700 atmospheres and in the presence of a buffered metal salt catalyst, said catalyst containing as essential ingredients a water-soluble salt of a metal from the group consisting of cobalt and iron and having a buffering agent incorporated therein of a kind and in sufficient quantity to obtain a pH within the range of 6-7 said buffering agent consisting essentially of an alkali metal salt of a corboxylic acid, withdrawing from the aforesaid reaction liquid containing the lower aliphatic aldehyde produced and catalyst, separating at least a part of the aldehyde to leave a catalyst remainder, and recycling to the reaction at least a part of the remainder which contains catalyst.

2. The process of claim 1 in which the recycled portion is supplemented with further catalyst and buffering agent prior to recycling.

3. A process of making propionaldehyde which comprises reacting ethylene, carbon monoxide, and hydrogen at elevated temperatures and pressures within the range of 50° C. to 250° C. and 40 to 700 at. and in the presence of a buffered catalyst, said catalyst containing as essential ingredients a catalytic component from the group consisting of cobalt and iron, said catalyst also having incorporated therein a buffering agent essentially comprised of an alkali metal salt of a carboxylic acid.

4. A process for producing aldehydes which comprises reacting an aliphatic olefin with carbon monoxide and hydrogen, said reaction being carried out at elevated temperatures and pressures within the range of 50° C. to 250° C. and 40 to 700 at. and in the presence of a buffered catalyst, the catalyst containing as essential ingredients a catalytic component from the group consisting of cobalt and iron and a content of a sodium salt of a carboxylic acid as a buffering agent.

5. A process in accordance with claim 4 wherein the buffering agent is a potassium salt.

6. In a process of producing oxygenated compounds by a procedure which includes reacting an olefinic compound with carbon monoxide and hydrogen at elevated temperatures and pressures in the presence of a catalyst, the improvement which comprises employing a buffered metal salt catalyst, said catalyst containing as essential ingredient a water-soluble salt of metal from the group consisting of cobalt and iron and having a buffering agent incorporated therein of a kind and in sufficient quantity to obtain a pH within the range of 6 to 7, said buffering agent consisting essentially of an alkali metal salt of a carboxylic acid.

7. A process for producing organic carbonyl compounds which comprises reacting feed materials essentially comprised of olefins, carbon monoxide and hydrogen at elevated temperatures and pressures within the range of 50° C. to 250° C. and 40 to 700 at., the reaction being carried out in the presence of a buffered catalyst, said catalyst containing as an essential ingredient a component from the group consisting of cobalt and iron and having a buffering agent incorporated therein, said buffering agent consisting essentially of an alkali metal salt of a carboxylic acid and at least a part of the time during the process operating the process within the upper part of the pressure range aforesaid.

8. The process for producing lower aliphatic aldehydes which comprises reacting a lower aliphatic olefin with carbon monoxide and hydrogen, said reaction being carried out under elevated temperatures and pressures and in the presence of a catalyst, the catalyst being characterized in that it consists essentially of a derivative of the metal from the group consisting of cobalt and iron in the presence of an alcohol and a buffering agent, the buffering agent being comprised of an alkali metal salt of a carboxylic acid.

HUGH J. HAGEMEYER, JR.

REFERENCES CITED

The following references are of record in the file of this patent:

UNITED STATES PATENTS

| Number | Name | Date |
|---|---|---|
| 2,437,600 | Gresham et al. | Mar. 9, 1948 |

OTHER REFERENCES

"Interrogation of Dr. Otto Roelen," PB-77705, July 18, 1947, pages 43 to 47, Hobart Publishing Co., Washington, D. C.

Holm et al., Fiat Final Report No. 1000, PB-81383, December 26, 1947, pages 28, 29 and 34.

Mellor, "Comprehensive Treatise on Inorganic and Theoretical Chemistry," vol. 14, pages 810 to 813 (1935).